US011323896B2

(12) United States Patent
Decuir et al.

(10) Patent No.: US 11,323,896 B2
(45) Date of Patent: *May 3, 2022

(54) DATA PARKING WITHIN OFFLINE COMMUNITY SYSTEM

(71) Applicant: AT&T Intellectual Property I, L.P., Atlanta, GA (US)

(72) Inventors: Jason Decuir, Cedar Park, TX (US); Robert Gratz, Lockhart, TX (US); Eric Zavesky, Austin, TX (US); James Pratt, Round Rock, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/010,048

(22) Filed: Sep. 2, 2020

(65) Prior Publication Data
US 2020/0404516 A1 Dec. 24, 2020

Related U.S. Application Data

(63) Continuation of application No. 16/108,261, filed on Aug. 22, 2018, now Pat. No. 10,798,592.

(51) Int. Cl.
*H04W 24/04* (2009.01)
*H04L 12/46* (2006.01)
*H04W 4/90* (2018.01)
*H04W 76/10* (2018.01)
*H04W 88/04* (2009.01)
(Continued)

(52) U.S. Cl.
CPC ......... *H04W 24/04* (2013.01); *H04L 12/4633* (2013.01); *H04W 4/90* (2018.02);
(Continued)

(58) Field of Classification Search
CPC ....... H04W 24/04; H04W 4/90; H04W 76/10; H04W 8/005; H04W 64/003;
(Continued)

(56) References Cited

U.S. PATENT DOCUMENTS 7,675,423 B2  3/2010 Boling et al.
8,483,888 B2  7/2013 Boileau et al.
(Continued)

FOREIGN PATENT DOCUMENTS

WO  WO 2017/140440 A1  8/2017
WO  WO-2017140440 A1 *  8/2017 ........... G08B 25/014

*Primary Examiner* — Mewale A Ambaye
(74) *Attorney, Agent, or Firm* — Guntin & Gust, PLC; Kenneth Kwan

(57) ABSTRACT

A method, where the method includes discovering an event where at least one device is offline and instantiating an emergency mode causing the at least one device to permit data or message aggregation. The method further includes defining a community of devices including an identity of the at least one device and establishing communication between the at least one device and a mobile aggregation device. The method further includes when the mobile aggregation device is in communication with the at least one device, aggregating a payload of a message or data from the at least one device and the community having an artificial intelligence instantiated as a virtual network function or network device, the community communicating with the mobile aggregation device to receive data from the at least one device, and the artificial intelligence being configured to assess the event based on the data obtained by the mobile aggregation device.

20 Claims, 16 Drawing Sheets

(51) Int. Cl.
*H04W 8/00* (2009.01)
*H04W 64/00* (2009.01)
*H04W 88/16* (2009.01)
*H04L 45/02* (2022.01)

(52) U.S. Cl.
CPC ......... *H04W 8/005* (2013.01); *H04W 64/003* (2013.01); *H04W 76/10* (2018.02); *H04W 88/04* (2013.01); *H04W 88/16* (2013.01); *H04L 45/02* (2013.01)

(58) Field of Classification Search
CPC .................. H04W 88/04; H04W 88/16; H04L 12/4633; H04L 45/02
See application file for complete search history.

(56) References Cited

U.S. PATENT DOCUMENTS

| | | |
|---|---|---|
| 8,718,477 B2 | 5/2014 | DeVaul et al. |
| 9,094,816 B2 | 7/2015 | Maier et al. |
| 9,749,830 B2 | 8/2017 | Meredith et al. |
| 2003/0069002 A1 | 4/2003 | Hunter et al. |
| 2008/0013484 A1 | 1/2008 | Chang et al. |
| 2009/0004997 A1 | 1/2009 | Allen et al. |
| 2011/0280178 A1 | 11/2011 | Heifner |
| 2012/0177003 A1* | 7/2012 | Chan ................. H04W 36/0066 370/331 |
| 2014/0155098 A1 | 6/2014 | Markham et al. |
| 2014/0368601 A1 | 12/2014 | deCharms |
| 2016/0164619 A1 | 6/2016 | Sennett et al. |
| 2017/0156044 A1 | 6/2017 | Meredith et al. |
| 2017/0242428 A1* | 8/2017 | Pal ........................ A61B 5/021 |
| 2017/0279957 A1 | 9/2017 | Abramson et al. |
| 2017/0301214 A1 | 10/2017 | Chen et al. |
| 2018/0037320 A1 | 2/2018 | Ko |
| 2018/0053401 A1* | 2/2018 | Martin ................ H04L 12/1895 |
| 2018/0160282 A1 | 6/2018 | van de Poll |
| 2019/0174276 A1* | 6/2019 | Mineiro Ramos de Azevedo ...... H04W 4/38 |
| 2020/0068419 A1* | 2/2020 | Decuir ................ H04L 12/4633 |

\* cited by examiner

DATA PARKING WITHIN OFFLINE COMMUNITY SYSTEM

CROSS REFERENCE TO RELATED APPLICATIONS

This application is a continuation of, and claims priority to, U.S. patent application Ser. No. 16/108,261, filed Aug. 22, 2018, entitled "DATA PARKING WITHIN OFFLINE COMMUNITY SYSTEM," the entire contents of which are hereby incorporated herein by reference.

TECHNICAL FIELD

The disclosure relates to networked resources, and more particularly to a data parking within an offline community. Most particularly, the disclosure relates to a data parking system that includes a mitigating operational protocol using a mobile aggregation device to transport aggregated data to one or more devices in an offline community.

BACKGROUND

As devices become more ubiquitous and natural disasters or other emergency conditions affect more individuals, the need for fast, decisive, and regimented recovery operations becomes increasingly imperative. One shortcoming of existing infrastructure is the need to emulate or recover a normal operational mode before most network devices can resume any operation. Additionally, when communicating between network assets that may go on-line and off-line, such as during intermittent power or connectivity, these network components must learn how to efficiently aggregate and distribute data and messages.

This disclosure is directed to solving one or more of the problems in the existing technology.

SUMMARY

The present disclosure is directed to a computer-implemented method. The computer-implemented method includes discovering, by a processor, an event where at least one device is offline. The computer-implemented method further includes instantiating, by the processor, an emergency mode causing the at least one device to permit data or message aggregation. The computer-implemented method further includes defining, by the processor, a community of devices including an identity of the at least one device. The computer-implemented method further includes establishing, by the processor, communication between the at least one device and a mobile aggregation device. The computer-implemented method further includes when the mobile aggregation device is in communication with the at least one device, aggregating, by the processor, a payload of a message or data from the at least one device. The computer-implemented method further includes the community of devices having an artificial intelligence instantiated as a virtual network function or network device, the community of devices communicating with the mobile aggregation device to receive data from the at least one device, and the artificial intelligence being configured to assess the event based on the data obtained by the mobile aggregation device.

The present disclosure is directed to a computer-readable storage medium storing executable instructions that when executed by a computing device cause said computing device to effectuate operations including discovering an event where at least one device is offline. Operations further include instantiating an emergency mode causing the at least one device to permit data or message aggregation. Operations further include defining a community of devices including an identity of the at least one device. Operations further include establishing communication between the at least one device and a mobile aggregation device. Operations further include when the mobile aggregation device is in communication with the at least one device, aggregating a payload of a message or data from the at least one device. Operations further include the community of devices having an artificial intelligence instantiated as a virtual network function or network device, the community of devices communicating with the mobile aggregation device to receive data from the at least one device, and the artificial intelligence being configured to assess the event based on the data obtained by the mobile aggregation device.

The present disclosure is directed to a system having a processor and a memory coupled with the processor. The processor effectuates operations including discovering an event where at least one device is offline. The processor further effectuates operations including instantiating an emergency mode causing the at least one device to permit data or message aggregation. The processor further effectuates operations including defining a community of devices including an identity of the at least one device. The processor further effectuates operations including establishing communication between the at least one device and a mobile aggregation device. The processor further effectuates operations including when the mobile aggregation device is in communication with the at least one device, aggregating a payload of a message or data from the at least one device. The processor further effectuates operations including the community of devices having an artificial intelligence instantiated as a virtual network function or network device, the community of devices communicating with the mobile aggregation device to receive data from the at least one device, and the artificial intelligence being configured to assess the event based on the data obtained by the mobile aggregation device.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

A data parking system is generally indicated by the number 200 in the accompanying drawings. As described in more detail below, system 200 includes a mitigating operation protocol using one or more mobile aggregation devices to aggregate and deliver messages and data within a parked, i.e. off-line, community on a network.

The network may include a telecommunications network, software defined network, local area network, and the like. Examples of various networks are provided in connection with FIGS. 4-10 and described below. The edge orchestration system 200 in the following description may be implemented within one or more of the various networks. Moreover, as discussed more completely below, system 200 may be instantiated as a network device within such networks or a virtual network function on a network.

Figure 1A:
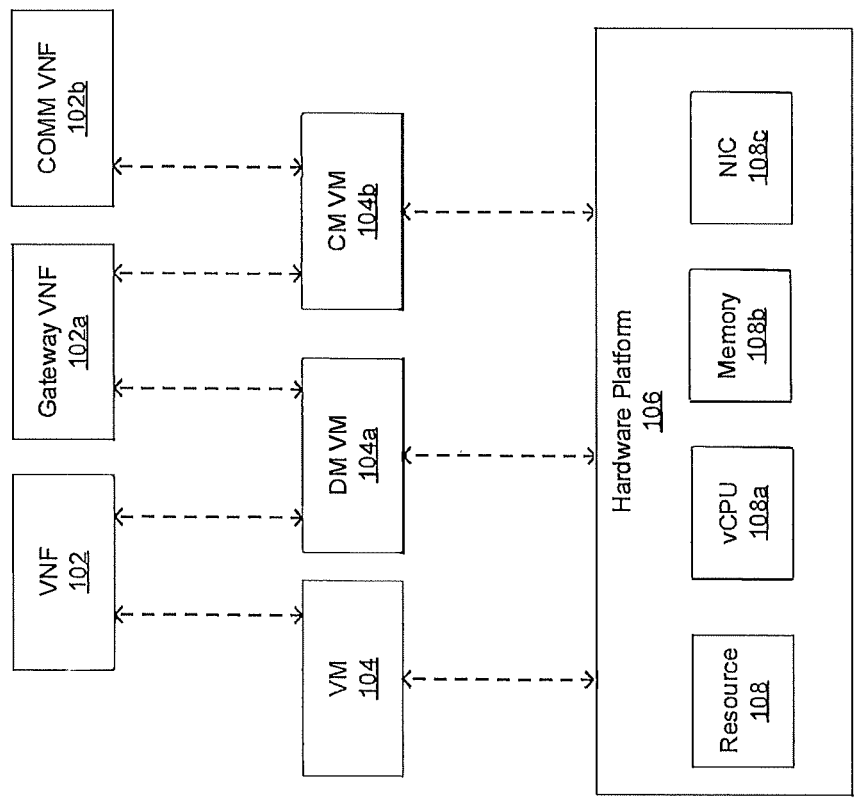
FIG. 1A is a representation of an exemplary network.

FIG. 1A is a representation of an exemplary network 100. Network 100 may comprise a software defined network or SDN—for example, network 100 may include one or more virtualized functions implemented on general purpose hardware, such as in lieu of having dedicated hardware for every network function. General purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1A illustrates a gateway VNF 102a and a community function (COMM) VNF 102b to facilitate data sharing within a community as described below. Additionally or alternatively, VNFs 102 may include other types of VNFs including but not limited to security, routing, wide area network (WAN) optimization and others within a service providers virtual network offerings.

Each VNF 102 may use one or more virtual machine (VM) 104 to operate. Each VM 104 may have a VM type that indicates its functionality or role. For example, FIG. 1A illustrates a discovery module (DM) VM 104a and a community module (CM) VM 104b. Additionally or alternatively, VM 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
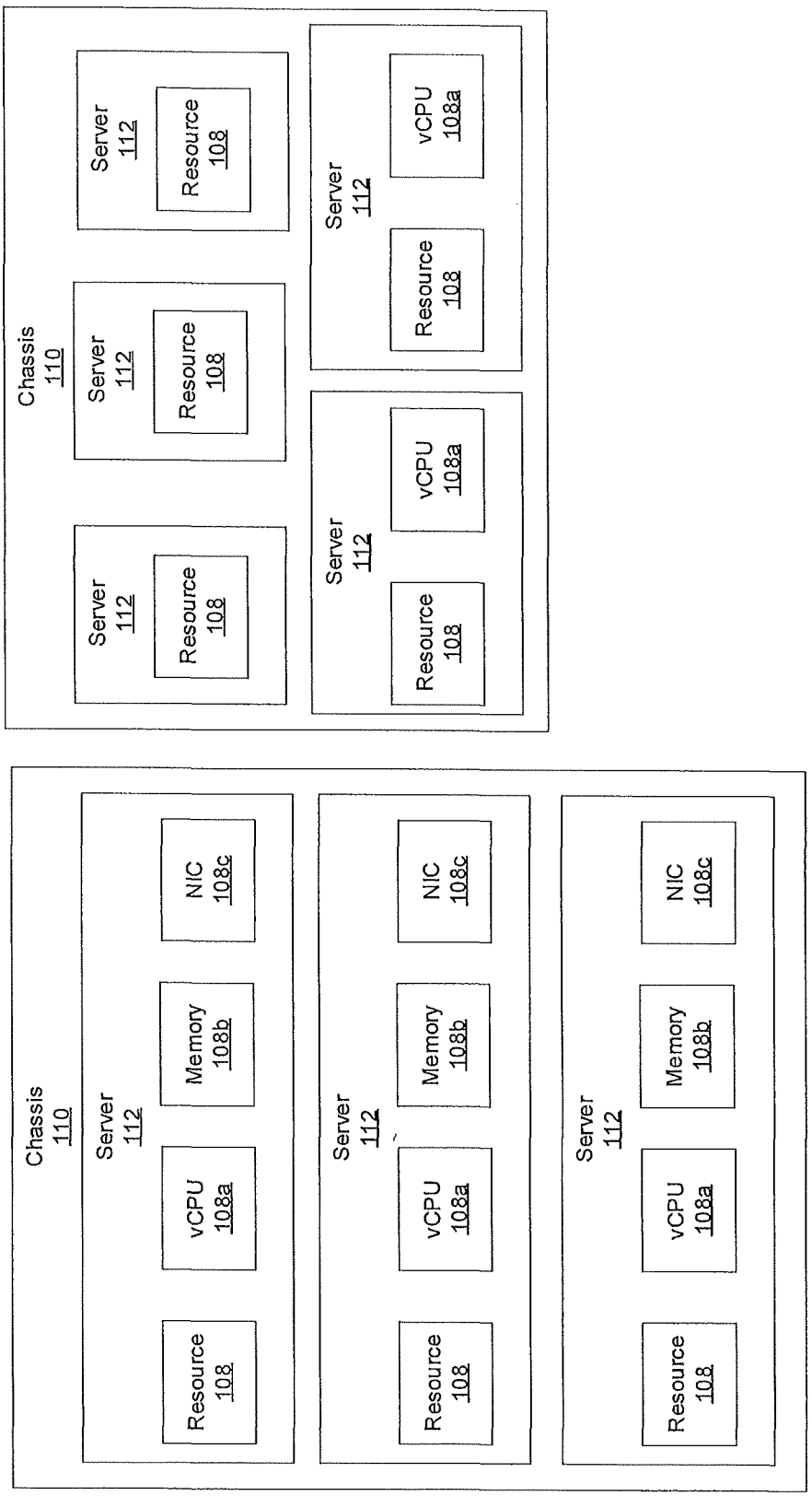
FIG. 1B is a representation of an exemplary hardware platform.

While FIG. 1A illustrates resources 108 as collectively contained in hardware platform 106, the configuration of hardware platform 106 may isolate, for example, certain memory 108c from other memory 108a. FIG. 1B provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together in any combination or arrangement.

The characteristics of each chassis 110 and each server 112 may differ. For example, FIG. 1B illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Figure 2:
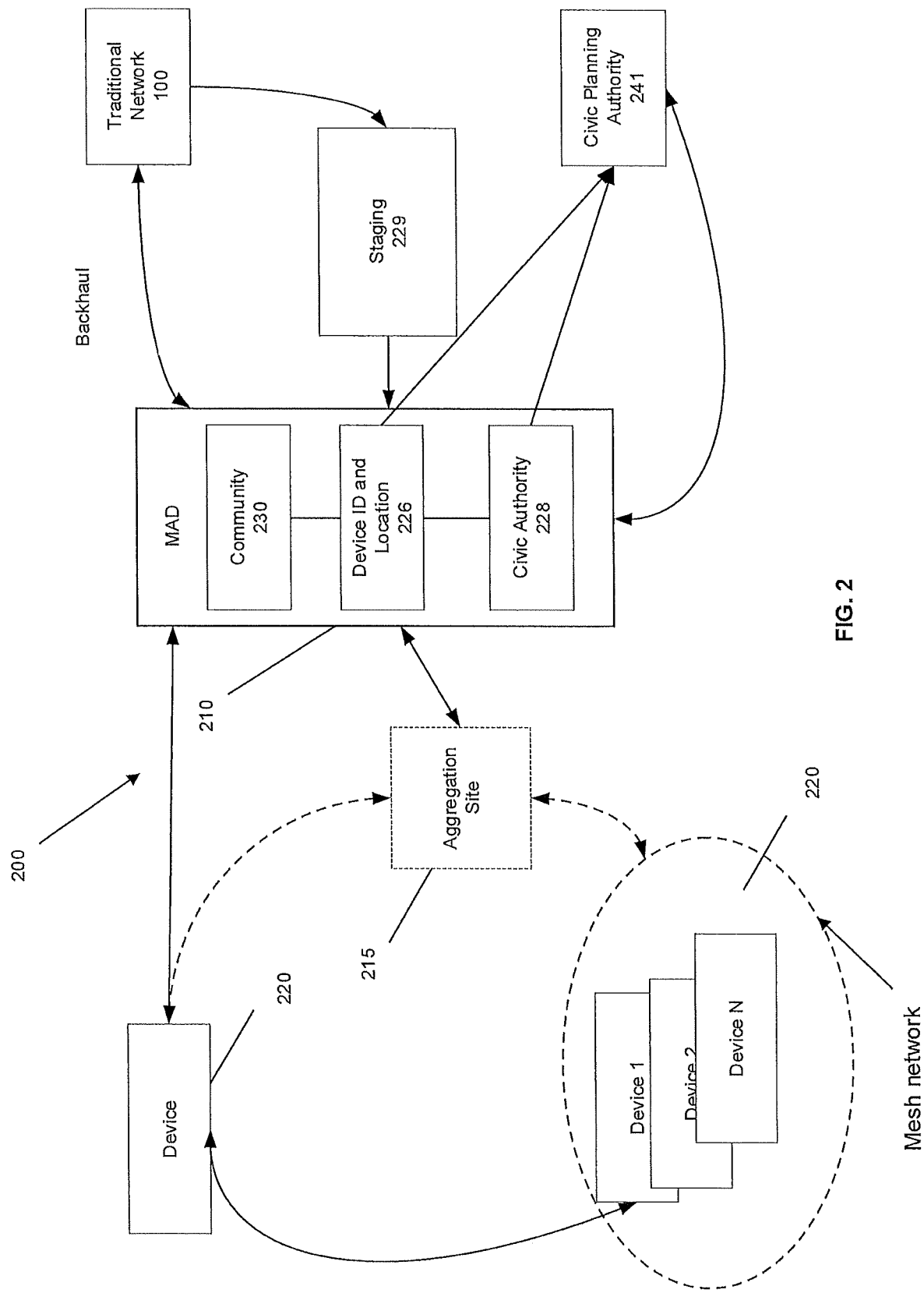
FIG. 2 is a representation of a data parking system according to an example.

FIG. 2 shows a representation of a system 200 according to an example of the disclosure. In the example, system 200 includes a mobile aggregation device 210 that facilitates communication with a parked community i.e. one or more devices 220 that are offline. The parked community may be offline for any reason including but not limited to a natural disaster, power outage, coverage outage, network failure, or other failure. For purposes of example, we will collectively refer to the lack of access or outage as an emergency. The result of the emergency is that affected devices are off-line i.e. parked. Using wireless mobility as an example, the emergency disrupts service. Devices 220 in that area receive no service. In turn, the devices may display a no service signal to a user. Under these circumstances, an attempt to communicate in the emergency zone would cause the outgoing signal to fail. For example, if an attempt was made to send a text, the text will not be delivered, and the device attempting to send the text would display a "not delivered" or similar message.

According to the example, system 200 provides a mitigating operation protocol (MOP) that allows the network infrastructure in an event area or zone Z to operate in a quasi-stable hybrid state. In this state, data is delivered in batches while leveraging existing assets with no backhaul resources. Once an emergency is detected, data is parked until it can be retrieved as discussed below. Devices 220 within the emergency zone Z may be identified and, if possible, set to an emergency mode. System 200 may also generate a community 230 of devices based on the devices identified as being within the emergency zone Z, parked devices.

According to one example, MOP may include a virtual network function, network device or other dedicated apparatus connected to a network 100 that upon detecting an emergency, performs operations including preemptively setting devices 220 (1 . . . N) identified as being affected by the emergency in an emergency mode. This operation may include automatically placing the device 220 in an emergency mode without feedback. System 200 may also await feedback, or a lack thereof, before placing the device in emergency mode. For example, system 200 may send a signal to a device 220 inquiring as to the status of the device 220. If no response is received indicating that the device has lost connectivity, a signal may be sent to place the device in emergency mode. For example, a signal may be sent to a tower that in turn may broadcast the emergency mode signal to devices that are offline. In instances, where the tower or other network broadcasting element is within an event zone and is unable to communicate with the core, the tower may place itself in emergency mode. To that end, tower or other device may check for the existence of conditions such as a loss of communication with a core network or loss of backhaul communication, and when such conditions exist, switch its operation to an emergency mode. When switched to emergency mode, tower or other device may broadcast a signal to switch devices within its communication range to emergency mode as well. Such a condition may include a time element, for example, if communication with the core network or backhaul communication is lost for a period of at least 6 hours, the tower switches to emergency mode. As an alternative or in addition to this feature, the tower may be manually switched into emergency mode via a signal from an MAD. In this way, if an event is detected, an MAD may be deployed to switch the tower before the time limit is reached providing greater responsiveness than the tower's internal conditions. Likewise, when the conditions that caused the tower or other device to enter emergency mode no longer exist, the tower or device may automatically switch back to normal operating mode. Automatic operation may check for the existence of connectivity with the core network or backhaul communication to trigger a switch back to normal mode. Again, to avoid cyclical switching when there is intermittent connectivity, the device may require connectivity for a time period before reverting to normal mode. Also, the tower or device may be switched back manually through a signal from the core network when connectivity is established or in some instance via a signal from MAD.

According to another example, system 200 predicts the flow/target for the area affected by the emergency by observing and adapting to network conditions.

System 200 may instantiate a community 230 that includes these parked devices. To that end, system 200 may employ discovery module VNF 104a to identify and inventory the devices that are off-line. A community module VNF 104b may gather data related to the devices to better define the community 220. As schematically shown, MAD 210 may communicate with community 230 via a traditional network 100 including the example networks described in more detail with reference to FIGS. 4-10. Community 230 may, at least in part, be instantiated within MAD and memory stores 226 for device ID and location information and commands or signals including civic authority data 228 may also be instantiated within MAD 210. As the MAD 210 moves between a first location where it communicates with network 100 and a second location where it communicates with the parked devices 220, data may be staged in a staging memory store 229 before being transmitted to MAD 210. Likewise, upon establishing communication with network 100, MAD 210 may provide updates to a civic planning authority data store 241 including but not limited to device ID and location data and civic authority data.

Figure 2A:
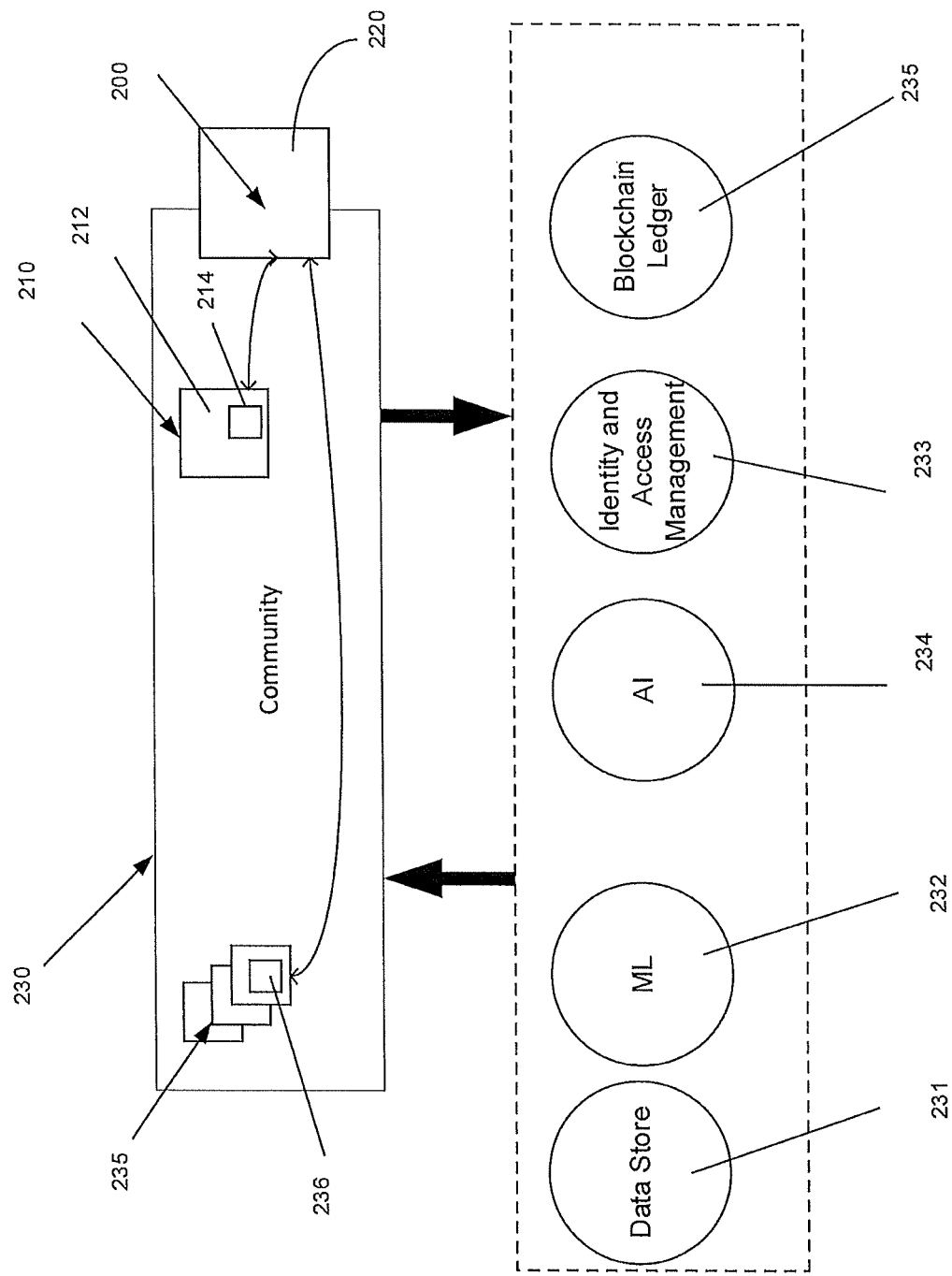
FIG. 2A is a representation of the system according to another example.

With reference to FIG. 2A, community 230 is a managed asset and may be instantiated as a network device or virtual network function. Community 230 includes a cohesive set of functionality including software defined networking, orchestration, and analytics to enable data sharing and collaboration. Community virtual network functions enable dynamic, on-demand combinations of data sourced from one or more entity and merged into a community 230 to derive insights in a highly secure environment. The community 230 may be closed in the sense that access controls or security functions are in place to execute user privacy settings, network policies, government regulations or other limitations on access to the data and related functionalities within community 230. Identity and access management 233 may orchestrate and monitor access to the community 230. For purpose of analytics, community 230 may include a machine learning tool 232 and an artificial or augmented intelligence tool 234. These tools may be instantiated as a network device or virtual network function within an SDN.

A community is defined and stored within a data platform in a network 100, such as for example, an Indigo® platform or the like. In one example, community 230 includes an audit ledger 250, such as a blockchain ledger. Community 230 may be a data community, a role community, a privilege community, and combinations thereof. In the examples discussed herein, a data community may simply gather data from the emergency zone including but not limited to device data including but not limited to whether a device has service, what mode a device is in, whether the device is transmitting, the location of the device, any input data received from the device, or other data generated by the device. The data community may further include network registration information (device on, device activity detected, etc.), query data obtained from device surveys, or other message information. A role community may leverage device related data to define roles of users/devices. A privilege community may assign functionality and network privileges based on a role or data. For example, a privilege community may provide additional data delivery, enhanced device functionality or network service, or push data to a particular device based on the device's role as a first responder device. Additional communities may be defined to further link data and network services. For example, an emergency community may include any device presumed to be affected by the emergency based on location or other information. Additional sub-communities within the emergency community may include outage devices, confirmed devices, normal activity devices, and prioritized devices, or other categories of devices relevant to a particular emergency. As described more completely below, interactions of the system 200 with devices 220, including but not limited to surveys or queries, may be used to infer the state of a device 220 and update the devices status or storage within a community 230.

According to a further example, additional device communities may be generated to provide selected devices with special roles, priority, and privileges. For example, FirstNet access may be provided to certain devices identified as being within a first responder community, technical service community or other community that may need different access or privileges to data and connectivity in view of the emergency.

Figure 2B:
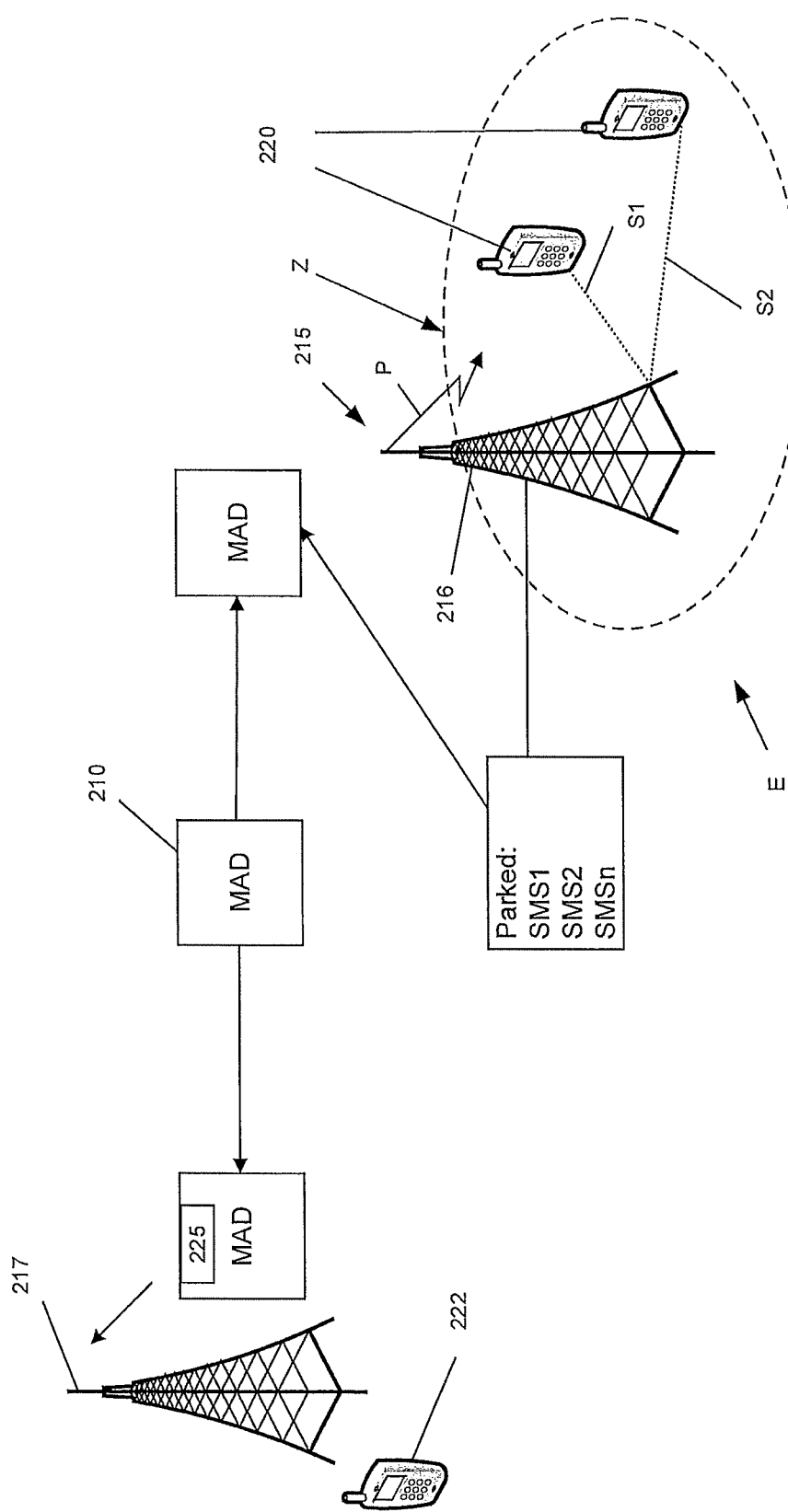
FIG. 2B is a representation depicting operation of the system according to an example.
Figure 2C:
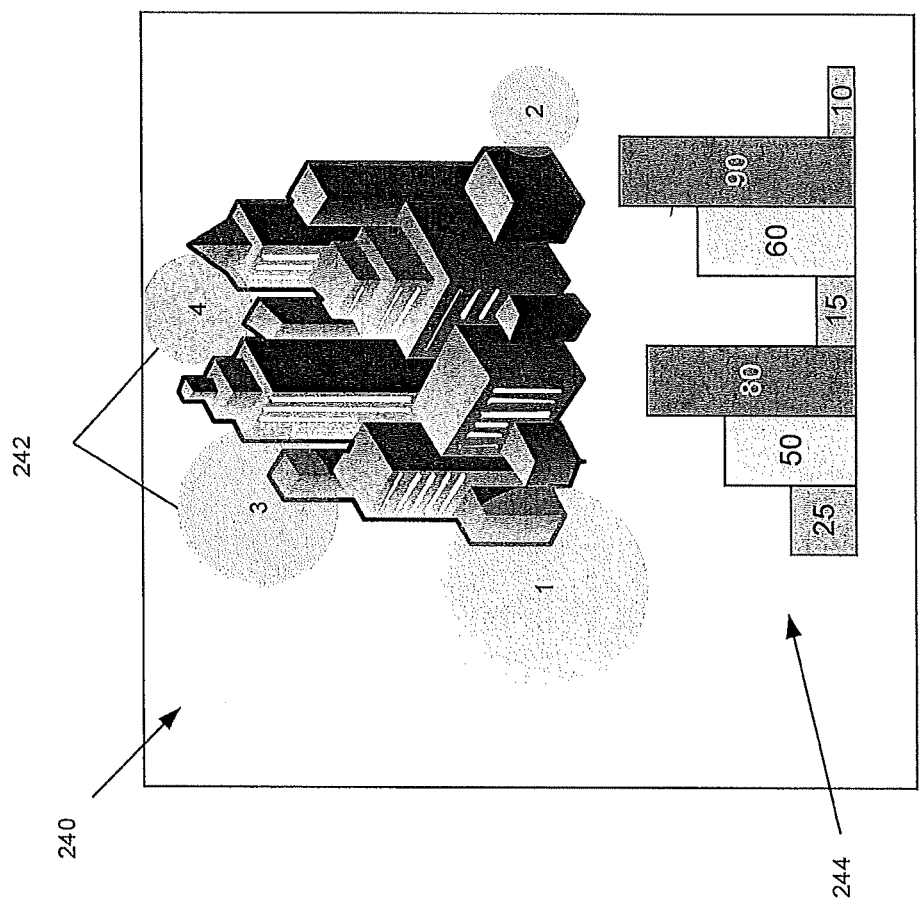
FIG. 2C is a schematic representation of a display generated by the system in response to an event.

Examples of the MOP including instantiating of one or more communities in connection with an event, such as an emergency will be discussed with reference to a simplified example shown in FIGS. 2B and 2C. FIG. 2B schematically depicts an event E, such as an emergency occurring near a tower 216. The event E may be anything that affects or limits communications between devices 220 and network 100. It will be appreciated that event E may include planned and unplanned outages or limitations on service. For purposes of example, an emergency event will be considered, such as, a natural or unnatural disaster that damages network assets or power supplies to such assets resulting in loss or impaired service within the area or zone surrounding the damage. The zone may not be as clearly defined as shown in the depicted example as the assets and devices affected may be scattered across a geographical area. The example, thus, should not be considered limiting.

With reference to the example in FIG. 2B, the event E has affected service surrounding the tower 216 forming an emergency zone Z. Devices 220 within the zone Z do not have service. As shown, a device 220 may be in the emergency zone Z and within communication range of a tower 216. Using the text message example, when a user within the emergency zone attempts to send a signal S carrying the text from device 220 to a receiving device 222, the text may be received at the tower 216, but due to the emergency outage, it cannot be transmitted from the tower 216 to receiving device 222. In the example, a pair of devices 220 are shown transmitting signals S1,S2 respectively. It will be understood that there may be any number of devices 220 in zone Z such that there may be signals S1, S2 . . . Sn.

According to the MOP, when placed in emergency mode, device 220 the message (schematically shown as SMS1, SMS2 . . . SMSn) is parked until it can be retrieved rather than retrying to send the message until a connection is obtained or indicating a message failed signal as in a normal device mode. In the example, tower 216 may act as an aggregation site 215 for multiple devices 220 (1, 2 . . . n).

When MAD 210 communicates with aggregation site 215, parked messages from the devices may be gathered via aggregation site 215 and uploaded as a payload 225 for delivery to a receiving site. With reference to FIG. 2B, tower 216 may broadcast a park signal P from MAD 210 to devices 220 indicating that the message was received and is parked. When an aggregation site is not used, as depicted in FIG. 2, park signal may be transmitted directly from MAD 210 to device 220. The park signal P may contain additional information as described below. The mobile aggregation device 210 retrieves the parked data and facilitates its complete transmission. Mobile aggregation device 210 may be a communication device capable of being moved into the emergency zone Z or at least into communication with emergency zone Z to facilitate communication of the data parked according to the MOP outside of the zone Z. Example MADs include but are not limited to a communications vehicle, such as a drone, UAV, a dirigible, a cell on wheels (CoW), parachute, temporary satellite access module, balloon, or similar device.

The MAD 210 is brought into communication with a device directly or if available with the aggregation site, generally indicated by the number 215. In the example shown in FIG. 2B, aggregation site 215 is a tower 216. It will be understood that an aggregation site 215 might include other network equipment including other mesh or fixed assets with no back haul resources. MAD 210 gathers the parked messages via tower 216. Once MAD 210 has gathered the parked messages and stored them within its memory as payload 225, it is moved to communicate the messages downstream to the intended recipient. This may involve having MAD 210 moving into communication with a receiving site, such as a second tower 217 that is in communication with the network such that the parked message is transmitted via the network to the recipient device 222. In other examples, where both sender and recipient are within zone or where multiple zones exist at the same time, MAD 210 may travel to another aggregation site or other point where communication may be established to transmit the parked message. It will be understood that in some instances, moving MAD 210 into the zone Z to establish communication with the aggregation site 215 may be sufficient to transmit the parked messages downstream. For example, MAD has sufficient signal strength to transmit to an unaffected tower 217. In other instances, as schematically shown in FIG. 2B, MAD 210 may be moved outside zone Z after gathering the messages to deliver them to a transmission site, such as tower 217. In still other examples, multiple MADs may be deployed or used in conjunction with mesh devices to form a bucket brigade to transmit parked messages. It will be understood that the same process in reverse would be used to aggregate messages that need to be delivered into the zone Z.

Often in an emergency event, in addition to a loss of service or connectivity, there are power outages that make it important to conserve battery life for devices 220 within zone Z. As indicated above, the park signal P may also be used to transmit a notice that a message is parked. The parked signal P may include other information including a scheduled time for the MAD arrival at tower 216. This would allow users to shut down devices 220 until the scheduled MAD arrival for additional transmitting/receiving of messages. For example, park signal P may indicate, "turn on your phone during a selected time period to send and receive messages, and turn it off to save battery."

According to another example, MOP may optionally include an operation that automatically switches the GPS radio within a device "on" to identify a device's location. If system 200 is not able to communicate the command to devices directly, this command may be transmitted from MAD 210 to devices 220 when MAD is in communication with the aggregation site 215 or devices 220. In this way, park signal P from MAD 210 may also include a command that alters the functionality of the device 220. In addition to activating the GPS location signal, command might also alter the functionality of the device to boost its broadcast power temporarily to assist in delivering the location to an aggregation site 215 and/or placing the device 220 in a low power or other power conservation mode. The device's location may be transmitted as an emergency message to aggregation site 215 for pick up by an MAD as described above.

The park signal P may also be used to send and receive mass messages within the zone Z to determine the status of devices 220. For example, park signal P may contain a survey or query that asks users to indicate their status via device 220. As an example, a survey signal may provide a message to hit 1 for safe but no power, 2 for injured but stable, 3 for running out of food/water, or 4 for critical medical emergency. From these queries, system 200 may aggregate data including the number, identity, and location of responding devices 220; the responses; or a combination of data to help identify locations of greatest need. System 200 would save this data in a data store 231 associated with the community 230 to provide and update device status with each MAD cycle. System 200 may use AI 233 to analyze the data to generate various outputs to one or more display to convey information about the devices in the emergency community or simply transmit data to assist in efforts to address the emergency. For example, as schematically shown in FIG. 2C, one display, generally indicated at 240, may include a map showing representations of the responding devices' locations and responses graphically at 242 to inform a viewer of the areas of greatest need. Other displays, such as graph 244, may indicate the number of devices affected. Display 240 may also identify the last known location of the device 220 and status of the user.

System 200 may assign priority to data/messages in terms of aggregation and delivery to address limits in the storage capacity of the MAD 210 and/or the speed of transmission of higher priority data/messages. For example, government surveys or other queries as discussed above, to obtain information on the emergency and those affected by it, may be assigned greater priority in terms of aggregation and delivery such that they receive a first in and first out placement within the MAD 210. Using the response examples above, greater priority may further be assigned based on the response type. For example, critical emergency responses may be given greater priority. Other tagging of messages aggregated by MAD 210 may occur including tags that prioritize and route responses or data obtained from devices 220 to other online communities, such as a first responder or FirstNet community and the like to deal with medical emergencies. Coverage maps and location data from devices may be routed to a technician community to identify the source of an outage or address the outage. Likewise, devices 220 within zone Z, such as a first responder or technician, may have a priority assigned to them such that they also receive priority handling of data/messages to facilitate their response to the emergency. To summarize, based on a role identified in the community or a message, system 200 may assign various types of priority or privilege including but not limited to a communications priority, time order priority, connectivity priority and data priority or privileges. The communications priority may include but is not limited to providing greater bandwidth, message capacity, delivery speed or the like. Time order priority may include but is not limited to ensuring that higher priority messages are the first in and first out from the MAD. Connectivity priority may include but is not limited to boosting a signal at a tower serving the community members with greater priority or facilitating connectivity through a Mesh network to re-establish connectivity on a core network faster than with other devices. Data priority and privileges may include but are not limited to providing data relating to the event or other members of the community to facilitate the role of the community device. For example, event information may be broadcast to a first responder or technician to help them respond to the event.

While the example of an emergency is provided, it will be understood that system 200 may employ a similar MOP in connection with other events. For example, events that drive high communication volume such as concerts, financial exchanges, sporting events or the like; events in remote locations where there is a lack of service or inconsistent service; and the like.

According to another example, system 200 may temporarily command devices or assets to operate out of specification in response to the MOP. For example, system 200 may instruct an asset to operate out of a power specification to boost the signal within zone Z to maximize the devices reached by the signal. MAD 210 may as part of its connection with an asset such as tower 216 in FIG. 2B, transmit a command from system 200 to operate tower 216 out of specification or otherwise boost the tower's signal temporarily while transmitting a park signal P. Likewise, system 200 may provide a command to decrease an asset's performance temporarily to conserve power. As with the park signal P to devices alerting the devices of the MAD schedule, the same schedule may be used to reduce signal output at the tower 216 while the MAD 210 is out of signal range. This may conserve energy within battery or other back-ups, or fuel consumed by generators operating during a power outage.

Figure 2D:
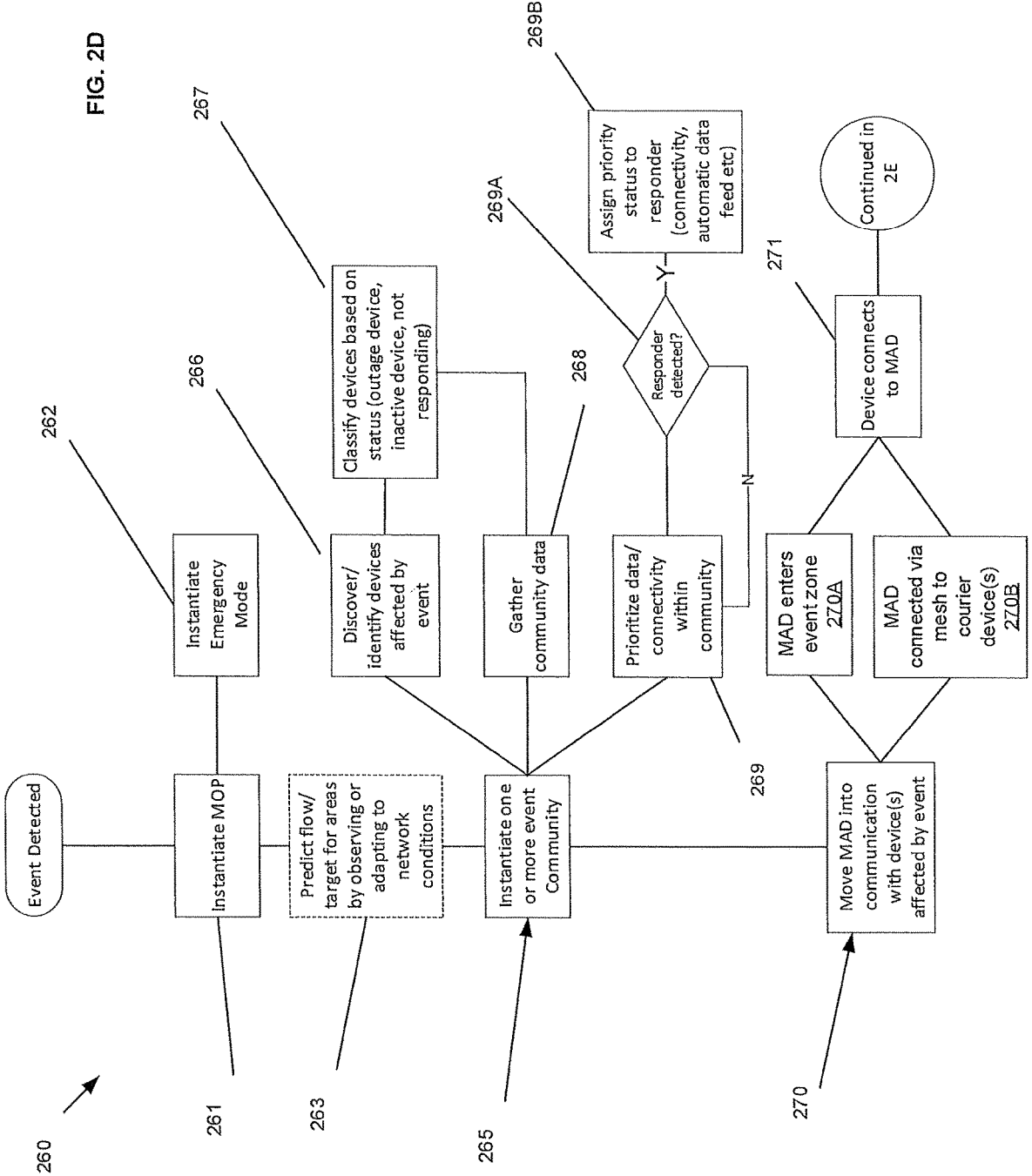
FIGS. 2D and 2E are a flow diagram depicting operation of a system according to an example.
Figure 2E:
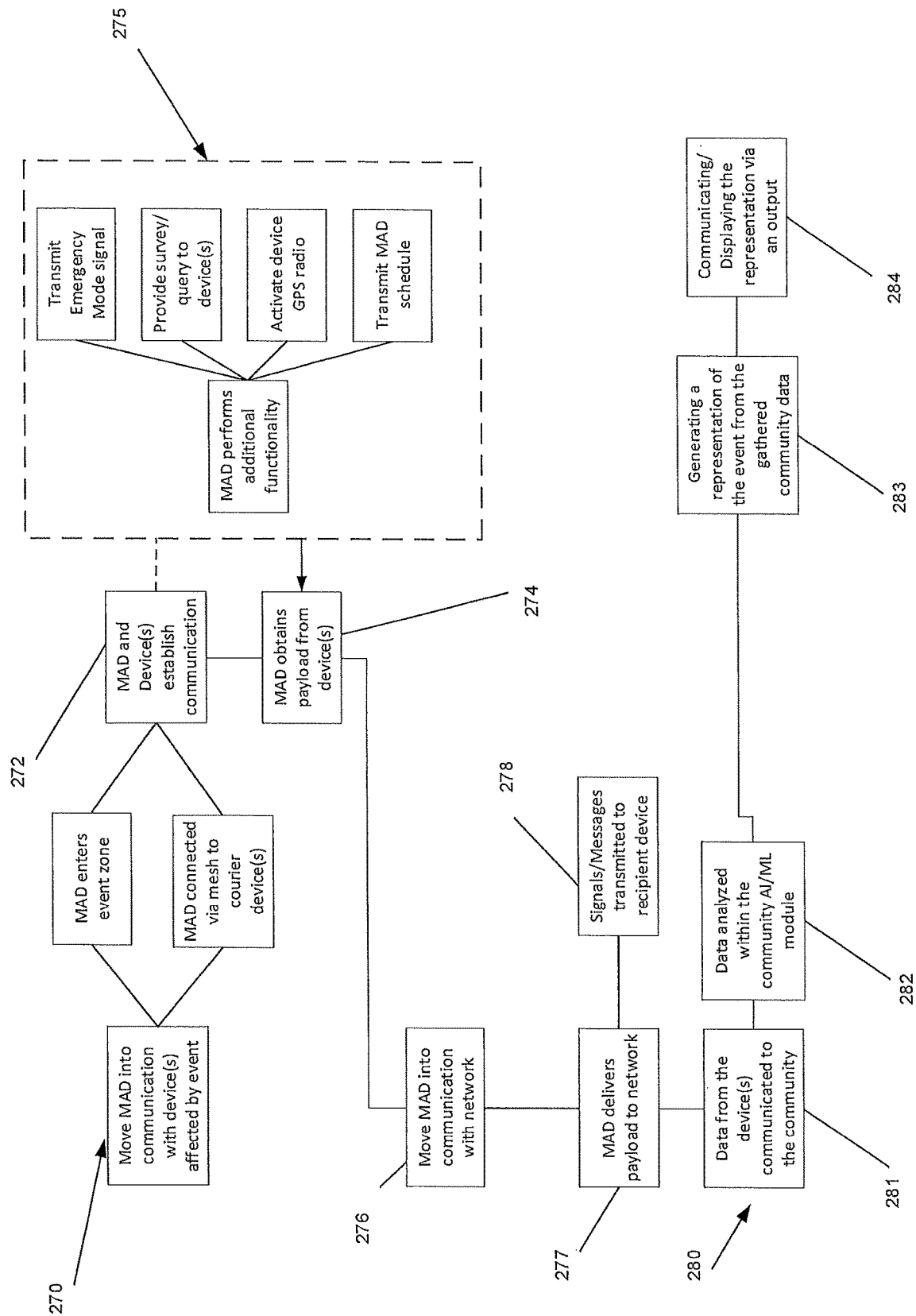

With reference to FIG. 2D, an example of operations, generally indicated by the number 260, performed by system 200 are described in response to an event E. When an event E is detected, system 200 instantiates the MOP at step 261. According to MOP, system 200 may instantiate an emergency mode at step 262 that provides a hybrid mode of operation for the affected device(s). Optionally at step 263, system 200 can predict the flow or target for the affected zone Z by observing or adapting to the network condition(s).

System 200 may also instantiate an event community 230 as generally indicated at step 265. This step may include discovering or identifying devices affected by the event at 266, which may also include classifying devices based on their status, i.e. outage device, inactive device or device not responding) at 267. It will be understood that the status of the device at the moment the event was detected may be used to initially populate community data store, and additional information obtained after an MAD connects with devices may be used to update the data store as discussed above. The community instantiation 265 may also include gathering community data from data sources available to system including data stores available through the network including but not limited to government alert data, weather services data, geography data, emergency profession data, employee data, and user data. These data stores may be proprietary or third-party data stores and may include communication with other communities for purposes of cross-checking or obtaining additional data. As shown, information obtained during step 267 may also be gathered at 268. The community instantiation 265 may also include prioritizing connectivity or data flows within the community at 269. For example, as shown, priority may be assigned based on identifying a device as being within a responder community, such as for example, a first responder or FirstNet community, a technician community, or other community that may need prioritized connectivity, communication or data to respond to the event E. When a responder is detected at 269A, system 200 may establish the appropriate priority for the responder at step 269B.

System 200 further performs the operation of moving the MAD 210 into communication with the device(s) affected by the event E as generally indicated by the number 270. To establish communication, MAD 210 may enter the zone Z 270A or establish a connection with device(s) that are in communication with the affected device(s) via a mesh network 270B to courier communications to the MAD 210. When a connection is established at 272, MAD 210 obtain a payload of data, messages, and the like at 274. As part of obtaining the payload, system 200 may send a park signal P to acknowledge that the payload has been uploaded to the MAD. System 200 may also use MAD 210 to perform various functions, generally indicated at 275 including but not limited to transmitting an emergency mode signal; providing a survey/query to device(s); activating a GPS radio within one or more device; and transmitting the MAD schedule. As discussed above, the park signal P may be used to transmit the signals from MAD to carry out these functions. Alternatively, distinct signals may be provided.

With a payload on board, system 200 may signal MAD 210 to have it move into communication with a receiving site that is connected to a network at 276. As before, communication may be established by moving the MAD to a location where communication can be established, or MAD may be connected to a device via mesh or other courier connection to the network. Once MAD 210 drops the payload at 277, the messages/data may be routed to the recipient device 222 at 278. Data may also be communicated to the community for review as generally indicated at 280. Community 230 may use AI module and or machine learning module to analyze data obtained from the at least one device in the offline community and/or other sources including but not limited to internal and external data sources, civic authorities, and location information at 282. The analysis 282 may include generating a representation of the at least one device(s), the event, the impact of the event on the network, possible collateral effects, or combinations thereof at 283. This representation or other information from the community may be communicated to an output device for further review or display at 284.

Figure 3:
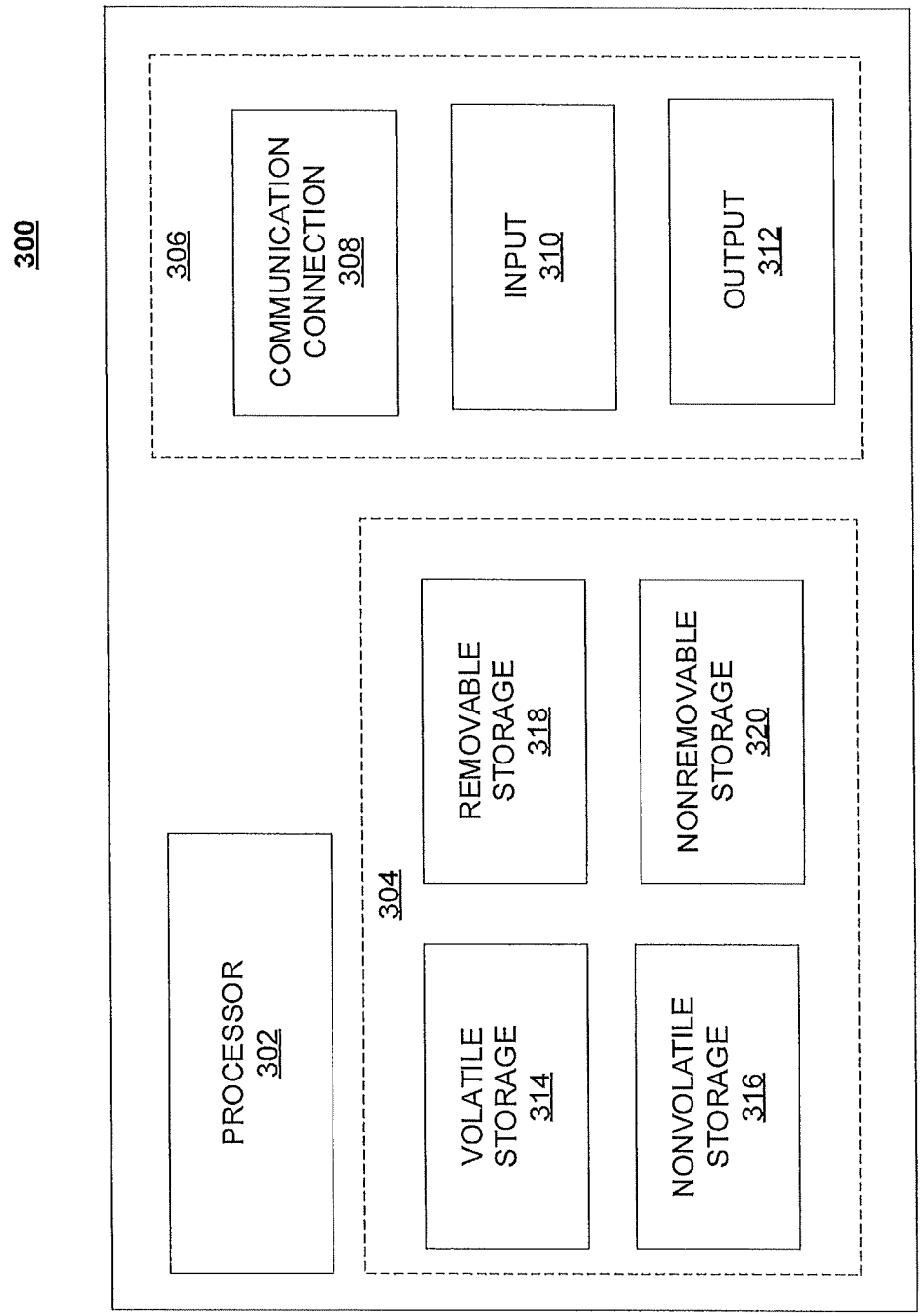
FIG. 3 is a representation of a network device according to an example.

As discussed above, system 200 may implement the MOP via at least one of a virtual network function, virtual machine, or other network device. FIG. 3 illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations of the MOP including but not limited to discovery of devices 220 affected by an event E, instantiating a community 230 including such devices, and aggregating data and signals from those devices in the community 230.

System 200 may reside within any network. The following are example networks on which system 200 may reside. For purposes of centrality, system 200 may reside within a core network shown in the various examples below. However, it will be understood that system 200 may reside on any network edge router or network device providing the same function in connection with customer VRFs including but not limited to telecommunications networks, internet, and other networks described more completely below.

Figure 4:
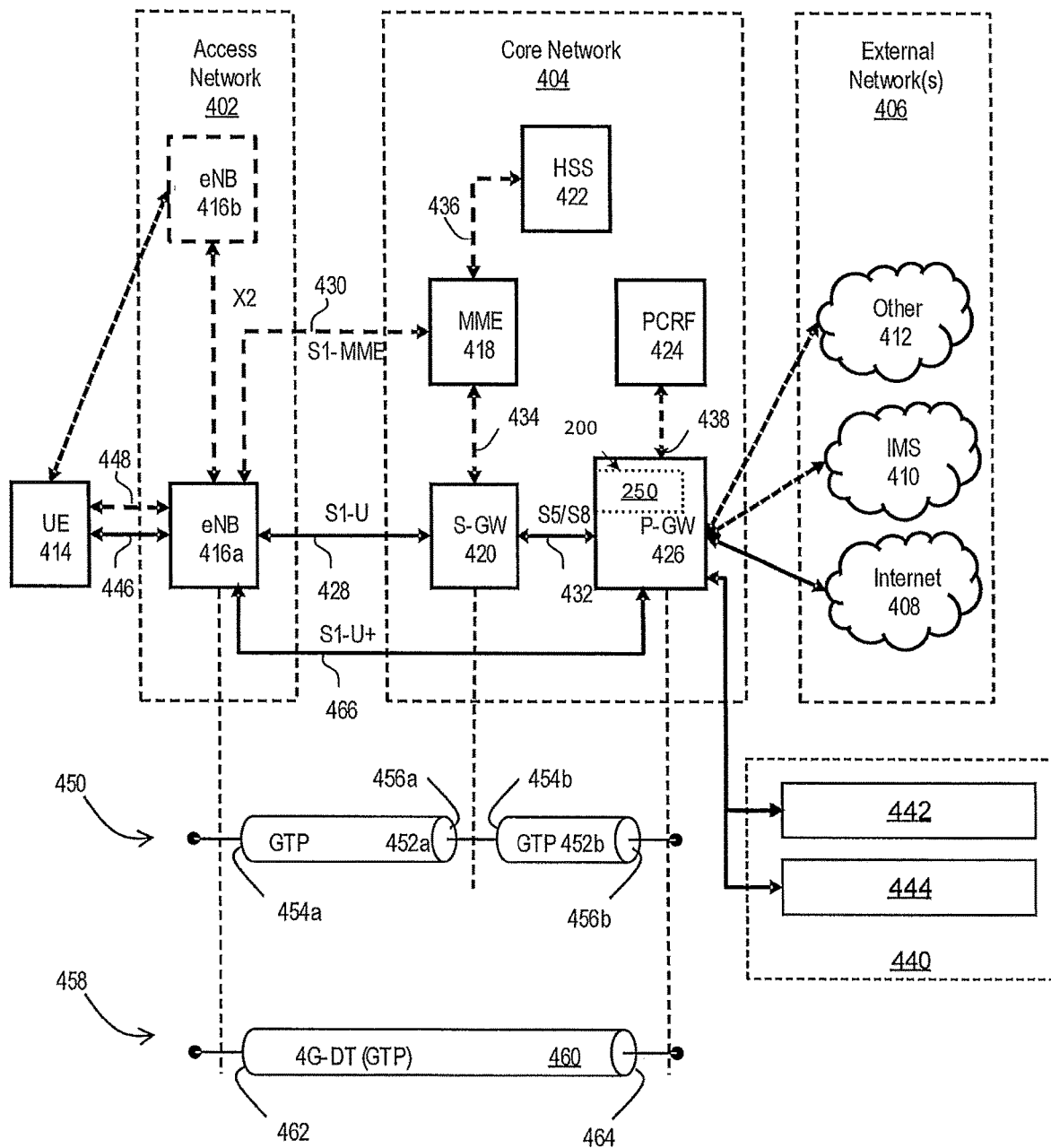
FIG. 4 depicts an exemplary communication system that provide wireless telecommunication services over wireless communication networks that may be at least partially implemented as an SDN.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches, and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426.

Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
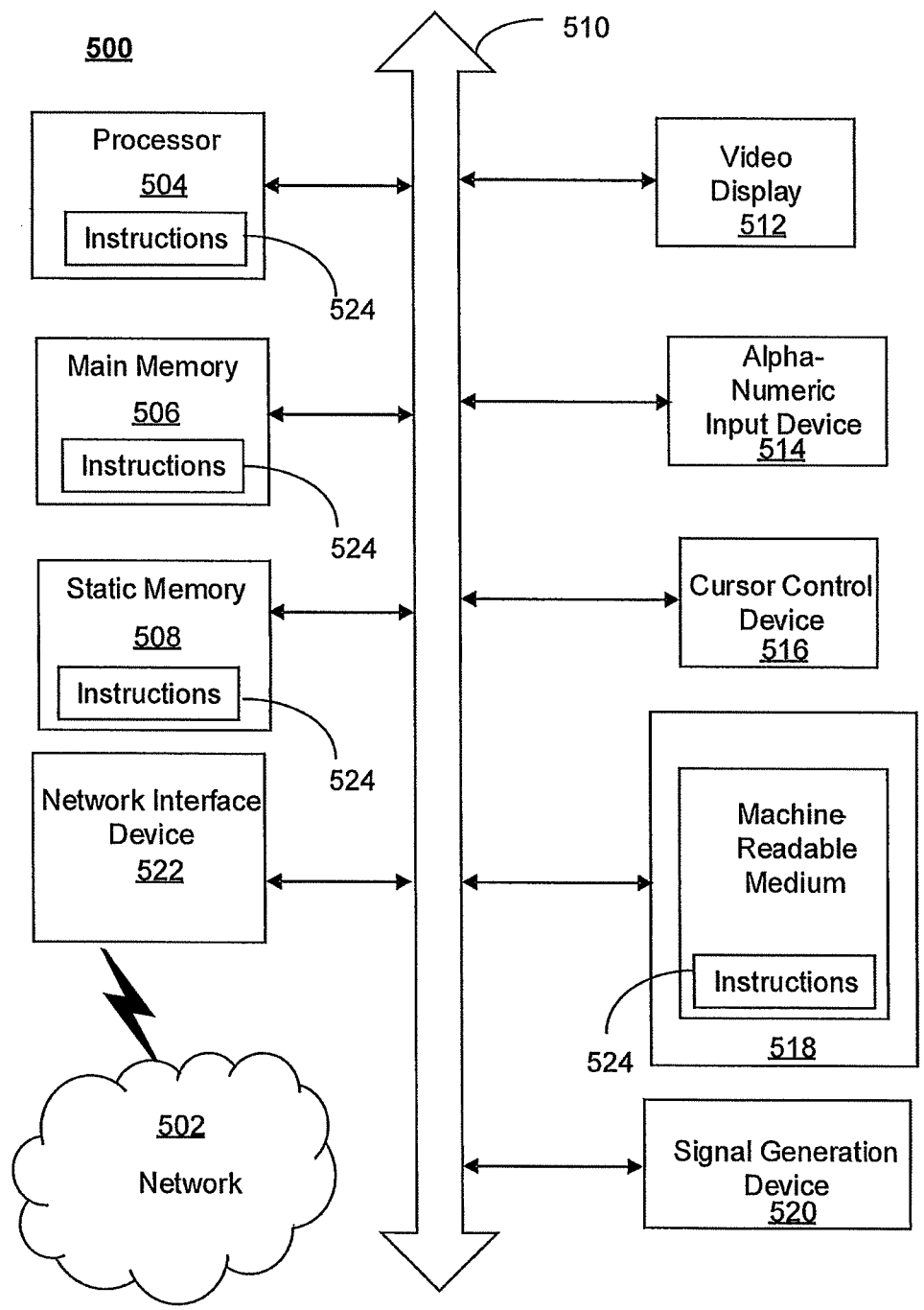
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
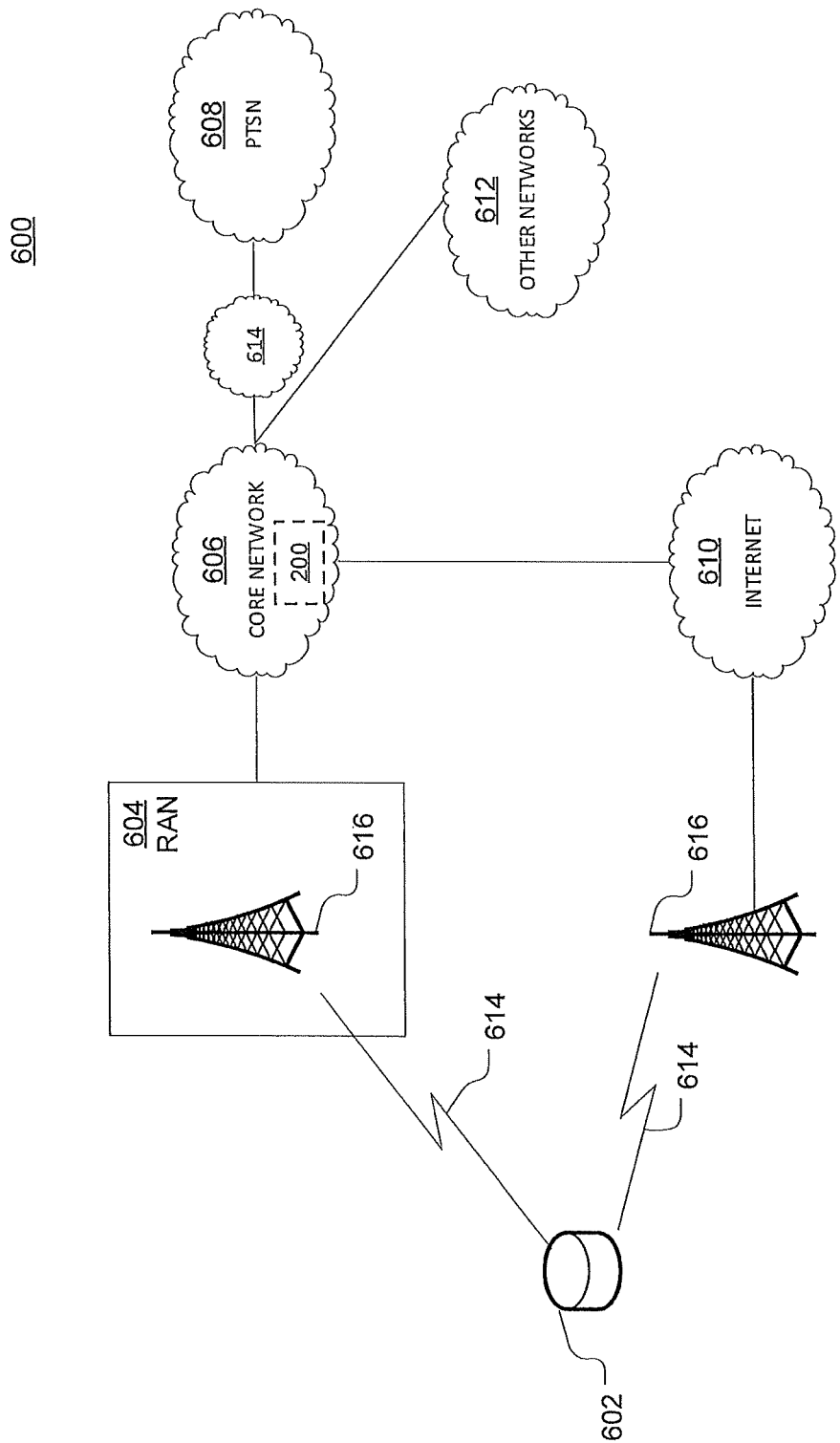
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
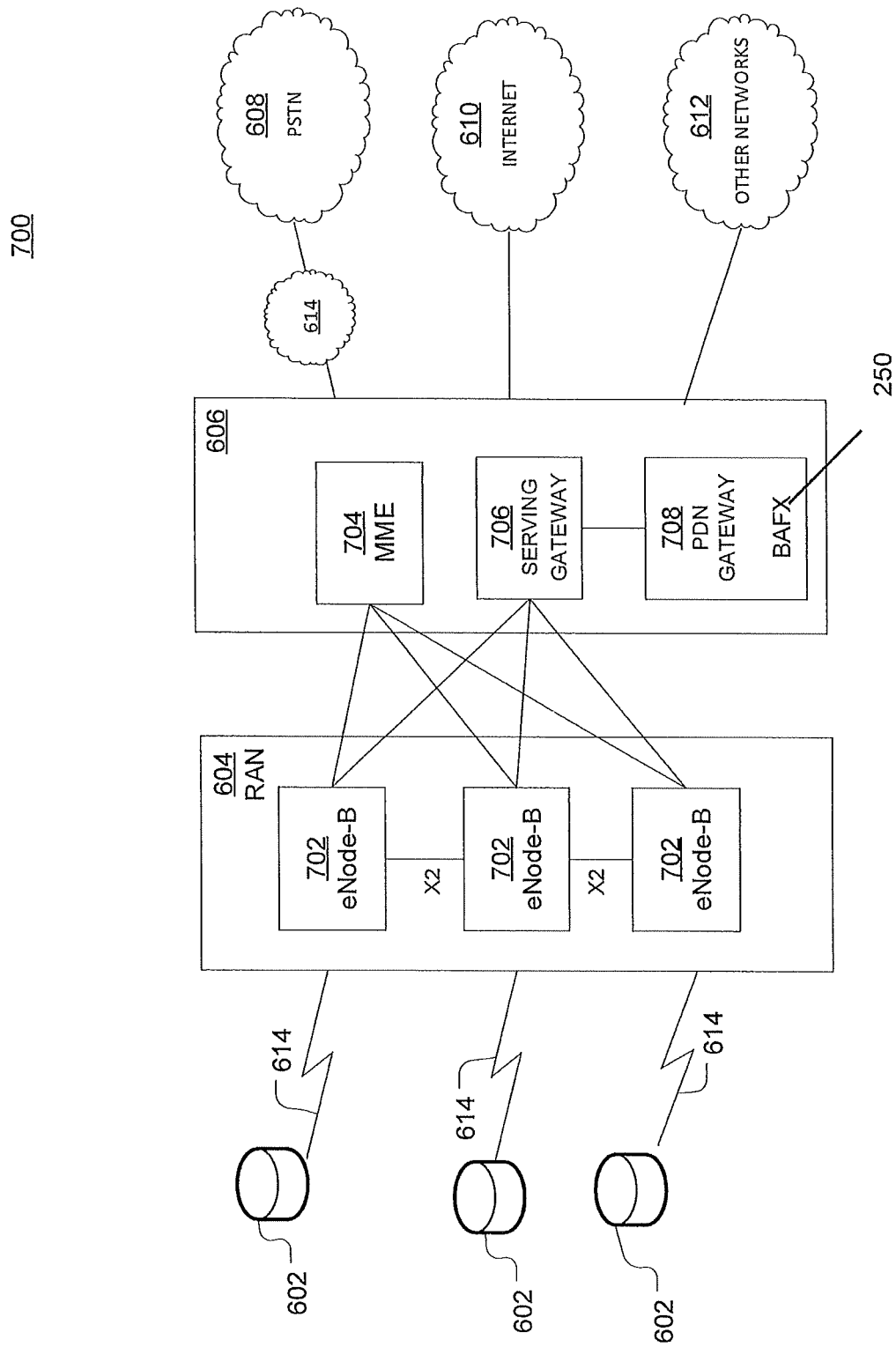
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
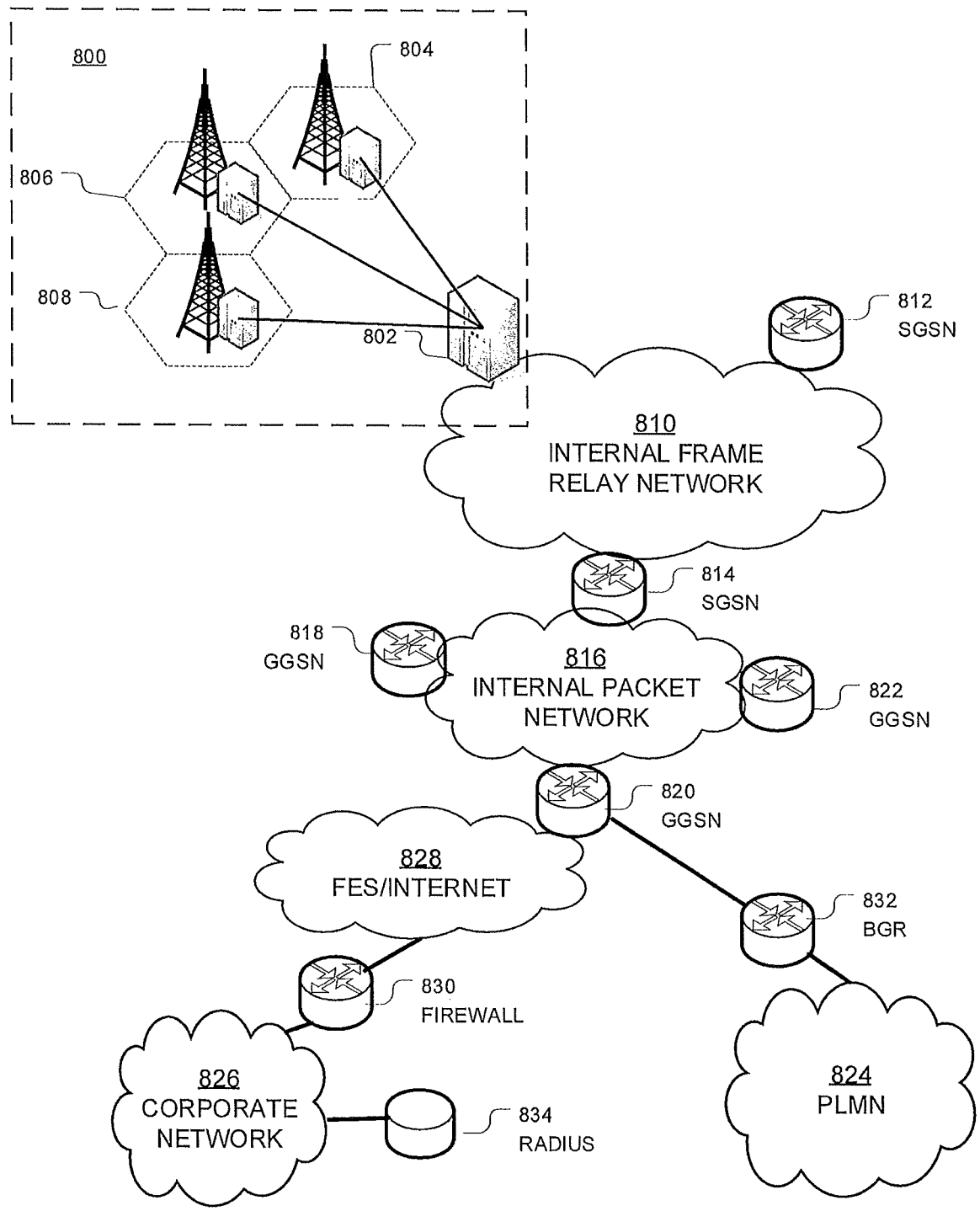
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
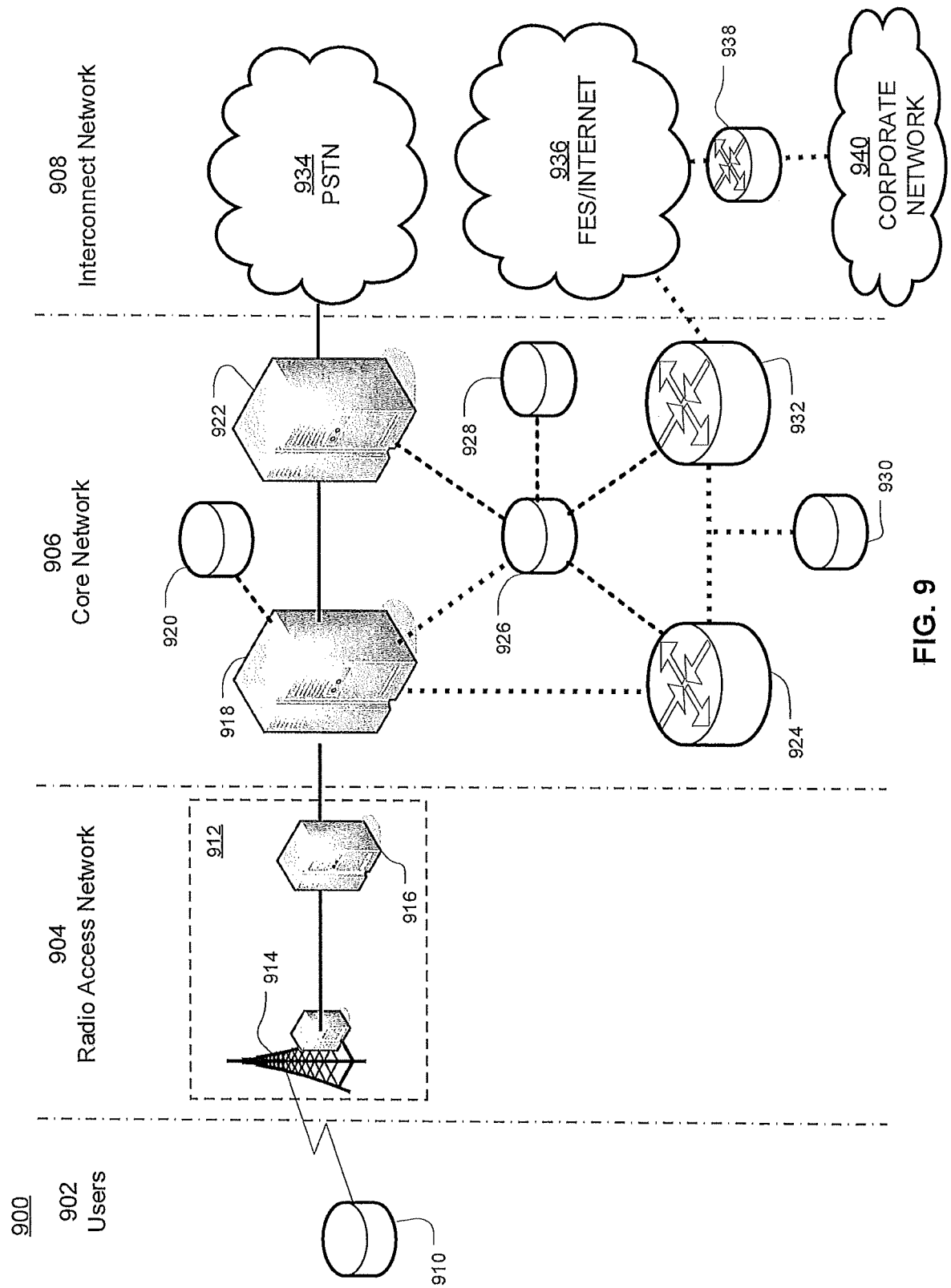
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038 (FIG. 10), or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
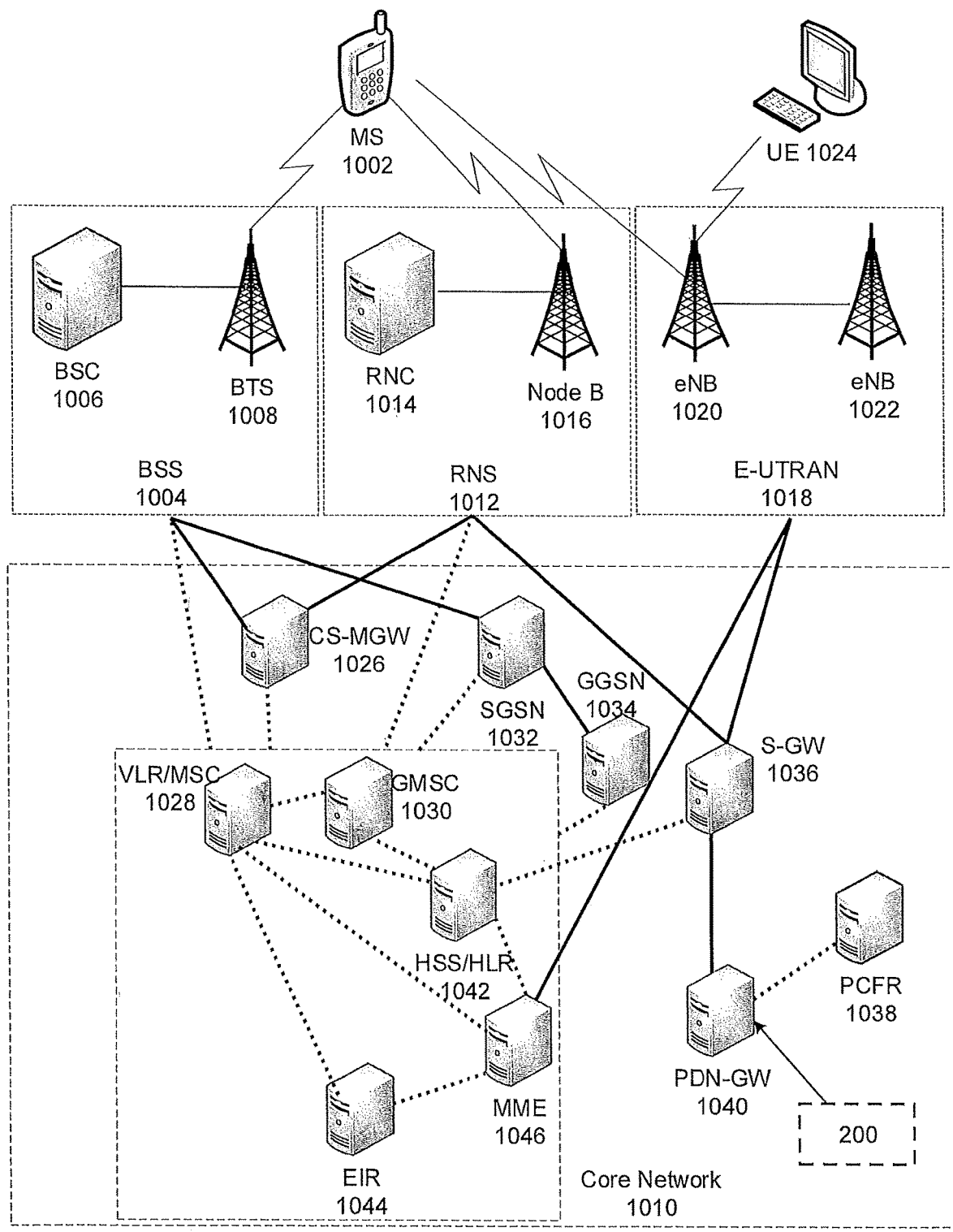
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed, or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "blacklisted" depending on its status in the network. If MS 1002 is stolen and put to use by an unauthorized user, it may be registered as "blacklisted" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

EXAMPLES

Example 1. A data parking in an offline community system comprising: a discovery module configured to identify at least one device that has gone offline due to an event; a community, the community including at least one data source, the data source including the identity of the at least one device; and a mobile aggregation device movable between a first position where the mobile aggregation device is in communication with a network to a second position to establish communication with the at least one device; wherein the mobile aggregation device is configured to aggregate data from the at least one device and store it until returning to the first position.

Example 2. The system of example 1, wherein the data stored in the mobile aggregation device is deployed to the network when the mobile aggregation device returns to the first position.

Example 3. The system of example 1, wherein the mobile aggregation device is configured to transmit a parked signal to the at least one device when the mobile aggregation device is in the second position.

Example 4. The system of example 3, wherein the parked signal includes at least one of an emergency mode signal, acknowledgement signal, a survey signal, a query signal, and a mobile aggregation device schedule signal.

Example 5. The system of example 4, wherein the mobile aggregation device is configured to await a response from the at least one device after sending at least one of the survey signal and the query signal.

Example 6. The system of example 4, wherein upon returning to the first position, mobile aggregation device communicates a device status signal based on a response or lack of a response from the at least one device to the parked signal.

Example 7. The system of example 1, wherein the community further comprises an artificial intelligence instantiated as a virtual network function or network device, wherein the community communicates with the mobile aggregation device to receive data from the at least one device, and wherein the artificial intelligence is configured to assess the event based on the data obtained by the mobile aggregation device.

Example 8. The system of example 1, wherein the mobile aggregation device communicates data from the at least one device to the community, and wherein the community includes a display, wherein the community is configured to provide an output representing the impact of the event.

Example 9. The system of example 1, wherein the mobile aggregation device is configured to transmit a signal to the at least one device when first reaching the second position placing the device in an emergency mode.

Example 10. The system of example 1, wherein the mobile aggregation device is configured to transmit a signal to the at least one device activating the GPS radio in the at least one device.

Example 11. The system of example 1, wherein the community is configured to identify a role associated with the at least one device, and assign a priority to the at least one device based on the role, wherein the priority includes at least one of a communication priority, a time order priority, a connectivity priority and a data priority.

Example 12. The system of example 11, wherein the communication priority identifies at least one priority device in the at least one device that is offline to the mobile aggregation device, wherein when the mobile aggregation device moves to the second position, data from the at least one priority device is uploaded before data from the at least one device that has not been identified as having priority.

Example 13. The system of example 1, wherein the community is configured to predict flow or target for the at least one device that is offline based on a network condition.

Example 14. A network device comprising: a processor, an input/output device coupled to the processor, and a memory coupled with the processor, the memory comprising executable instructions that when executed by the processor cause the processor to effectuate operations comprising discovering an event where at least one device is offline; instantiating an emergency mode causing the at least one device to permit data or message aggregation; instantiating a community including the identity of the at least one device; establishing communication between the at least one device and a mobile aggregation device; and when the mobile aggregation device is in communication with the at least one device, aggregating a payload of the message or data from the at least one device.

Example 15. The network device of example 14, wherein the operations further comprise moving the mobile aggregation device to establish communication with a receiving site in communication with a network, and deploying the payload to the network via the receiving site.

Example 16. The network device of example 14, wherein the step of establishing includes moving the mobile aggregation device into communication with an aggregation site, wherein the aggregation site is in communication with the at least one device.

Example 17. The network device of example 16, the step of instantiating emergency mode includes boosting a signal at the aggregation site, when the mobile aggregation is in communication with the aggregation site.

Example 18. The network device of example 14, wherein after the step of establishing, the operations include sending a parked signal to the at least one device.

Example 19. The network device of example 18, wherein the parked signal includes at least one of an emergency mode display signal, an acknowledgement signal, a survey signal, a query signal, and a mobile aggregation device schedule signal.

Example 20. The network device of example 14, wherein the operations further comprise gathering data within the community relating to the at least one device and generating a representation of the event from the data within the community and communicating the representation via the output.

The invention claimed is:

1. A method comprising:
    discovering, by a processor, an event where at least one device is offline;
    instantiating, by the processor, an emergency mode causing the at least one device to permit data or message aggregation;
    defining, by the processor, a community of devices including an identity of the at least one device;
    establishing, by the processor, communication between the at least one device and a mobile aggregation device; and when the mobile aggregation device is in communication with the at least one device, aggregating, by the processor, a payload of a message or data from the at least one device,
wherein the community of devices further comprises an artificial intelligence instantiated as a virtual network function or network device,
wherein the community of devices communicates with the mobile aggregation device to receive data from the at least one device, and
wherein the artificial intelligence is configured to assess the event based on the data obtained by the mobile aggregation device.

2. The method of claim 1, further comprising:
moving the mobile aggregation device to establish communication with a receiving site in communication with a network; and
deploying the payload to the network via the receiving site.

3. The method of claim 1, wherein establishing communication between the at least one device and the mobile aggregation device comprises moving the mobile aggregation device into communication with an aggregation site, wherein the aggregation site is in communication with the at least one device.

4. The method of claim 3, wherein instantiating the emergency mode causing the at least one device to permit data or message aggregation comprises boosting a signal at the aggregation site, when the mobile aggregation device is in communication with the aggregation site.

5. The method of claim 1 further comprising sending a parked signal to the at least one device.

6. The method of claim 5, wherein the parked signal comprises at least one of: an emergency mode display signal, an acknowledgement signal, a survey signal, a query signal, or a mobile aggregation device schedule signal.

7. The method of claim 1 further comprising gathering data within the community of devices relating to the at least one device and generating a representation of the event from the data within the community of devices and communicating the representation via an output.

8. A non-transitory computer-readable storage medium storing executable instructions that when executed by a computing device cause said computing device to effectuate operations comprising:
discovering an event where at least one device is offline;
instantiating an emergency mode causing the at least one device to permit data or message aggregation;
defining a community of devices including an identity of the at least one device;
establishing communication between the at least one device and a mobile aggregation device; and
when the mobile aggregation device is in communication with the at least one device, aggregating a payload of a message or data from the at least one device,
wherein the community of devices further comprises an artificial intelligence instantiated as a virtual network function or network device,
wherein the community of devices communicates with the mobile aggregation device to receive data from the at least one device, and
wherein the artificial intelligence is configured to assess the event based on the data obtained by the mobile aggregation device.

9. The non-transitory computer-readable storage medium of claim 8, the operations further comprising:
moving the mobile aggregation device to establish communication with a receiving site in communication with a network; and
deploying the payload to the network via the receiving site.

10. The non-transitory computer-readable storage medium of claim 8, wherein establishing communication between the at least one device and the mobile aggregation device comprises moving the mobile aggregation device into communication with an aggregation site, wherein the aggregation site is in communication with the at least one device.

11. The non-transitory computer-readable storage medium of claim 10, wherein instantiating the emergency mode causing the at least one device to permit data or message aggregation comprises boosting a signal at the aggregation site, when the mobile aggregation device is in communication with the aggregation site.

12. The non-transitory computer-readable storage medium of claim 8, the operations further comprising sending a parked signal to the at least one device.

13. The non-transitory computer-readable storage medium of claim 12, wherein the parked signal comprises at least one of: an emergency mode display signal, an acknowledgement signal, a survey signal, a query signal, or a mobile aggregation device schedule signal.

14. The non-transitory computer-readable storage medium of claim 8, the operations further comprising gathering data within the community of devices relating to the at least one device and generating a representation of the event from the data within the community of devices and communicating the representation via an output.

15. A data parking system comprising:
a processor; and
a memory coupled with the processor, the memory storing executable instructions that when executed by the processor, cause the processor to effectuate operations comprising:
discovering an event where at least one device is offline;
instantiating an emergency mode causing the at least one device to permit data or message aggregation;
defining a community of devices including an identity of the at least one device;
establishing communication between the at least one device and a mobile aggregation device; and
when the mobile aggregation device is in communication with the at least one device, aggregating a payload of a message or data from the at least one device,
wherein the community of devices further comprises an artificial intelligence instantiated as a virtual network function or network device,
wherein the community of devices communicates with the mobile aggregation device to receive data from the at least one device, and
wherein the artificial intelligence is configured to assess the event based on the data obtained by the mobile aggregation device.

16. The system of claim 15, the operations further comprising:
moving the mobile aggregation device to establish communication with a receiving site in communication with a network; and
deploying the payload to the network via the receiving site.

17. The system of claim 15, wherein establishing communication between the at least one device and the mobile aggregation device comprises moving the mobile aggregation device into communication with an aggregation site, wherein the aggregation site is in communication with the at least one device.

18. The system of claim 17, wherein instantiating the emergency mode causing the at least one device to permit data or message aggregation comprises boosting a signal at the aggregation site, when the mobile aggregation device is in communication with the aggregation site.

19. The system of claim 15, the operations further comprising sending a parked signal to the at least one device.

20. The system of claim 19, wherein the parked signal comprises at least one of: an emergency mode display signal, an acknowledgement signal, a survey signal, a query signal, or a mobile aggregation device schedule signal.

* * * * *